(12) United States Patent
Ananthabhotla (10) Patent No.: US 9,047,018 B1
(45) Date of Patent: Jun. 2, 2015

(54) METHOD AND SYSTEM FOR ZERO-COPY DISK IO USING SECTOR UNALIGNED BUFFERS

(75) Inventor: Anand Ananthabhotla, Fremont, CA (US)

(73) Assignee: EMC CORPORATION, Hopkinton, MA (US)

( * ) Notice: Subject to any disclaimer, the term of this patent is extended or adjusted under 35 U.S.C. 154(b) by 311 days.

(21) Appl. No.: 13/424,589

(22) Filed: Mar. 20, 2012

(51) Int. Cl.
*G06F 3/00* (2006.01)
*G06F 3/06* (2006.01)
*G06F 13/28* (2006.01)

(52) U.S. Cl.
CPC .............. *G06F 3/061* (2013.01); *G06F 3/0634* (2013.01); *G06F 3/0613* (2013.01); *G06F 3/0638* (2013.01); *G06F 3/0673* (2013.01); *G06F 13/28* (2013.01)

(58) Field of Classification Search
None
See application file for complete search history.

(56) References Cited

U.S. PATENT DOCUMENTS

| | | | | |
|---|---|---|---|---|
| 5,249,279 | A * | 9/1993 | Schmenk et al. | 710/5 |
| 5,497,476 | A * | 3/1996 | Oldfield et al. | 711/112 |
| 5,652,913 | A * | 7/1997 | Crick et al. | 710/36 |
| 5,761,411 | A * | 6/1998 | Teague et al. | 714/47.2 |
| 5,923,876 | A * | 7/1999 | Teague | 719/321 |
| 6,021,462 | A * | 2/2000 | Minow et al. | 711/114 |
| 6,330,623 | B1 * | 12/2001 | Wu et al. | 710/23 |
| 6,467,054 | B1 * | 10/2002 | Lenny | 714/42 |
| 6,553,438 | B1 * | 4/2003 | Coffman et al. | 710/52 |
| 6,594,712 | B1 * | 7/2003 | Pettey et al. | 710/22 |
| 6,678,754 | B1 * | 1/2004 | Soulier | 710/23 |
| 7,023,869 | B2 * | 4/2006 | Barrow et al. | 370/419 |
| 7,062,501 | B1 * | 6/2006 | Young | 1/1 |
| 7,380,115 | B2 * | 5/2008 | Maine | 713/2 |
| 7,734,832 | B2 * | 6/2010 | Callender | 710/5 |
| 8,079,036 | B2 * | 12/2011 | Callender | 719/310 |
| 8,392,689 | B1 * | 3/2013 | Lott | 711/201 |
| 2004/0186931 | A1 * | 9/2004 | Maine | 710/22 |
| 2005/0018709 | A1 * | 1/2005 | Barrow et al. | 370/465 |
| 2005/0086442 | A1 * | 4/2005 | McBrearty et al. | 711/159 |
| 2006/0101166 | A1 * | 5/2006 | Callender | 710/22 |
| 2006/0150199 | A1 * | 7/2006 | Callender | 719/328 |
| 2008/0320254 | A1 * | 12/2008 | Wingard et al. | 711/157 |
| 2011/0289417 | A1 * | 11/2011 | Schaefer et al. | 715/735 |
| 2012/0324181 | A1 * | 12/2012 | Garthwaite et al. | 711/159 |
| 2013/0067123 | A1 * | 3/2013 | Rizzo et al. | 710/22 |
| 2013/0117621 | A1 * | 5/2013 | Saraiya et al. | 714/748 |

OTHER PUBLICATIONS

IBM Technical Disclosure Bulletin NA9206348, 'Scatter/Gather Optimization of Queued Operations,' Jun. 1, 1992.*

* cited by examiner

*Primary Examiner* — Steven Snyder
(74) *Attorney, Agent, or Firm* — Dergosits & Noah LLP; Todd A. Noah (57) ABSTRACT

Data is transferred between a requesting application and a storage device by passing the application IO buffer to the disk driver. Techniques are provided to avoid data copying to an intermediate sector aligned buffer and passing the intermediate buffer to the disk driver. The techniques allow the use of layered block device drivers such as a Logical Volume Manager (LVM), Distributed Replicated Block Device (DRBD), or both. A look-ahead can determine the IO constraints imposed by the layered block device drivers. Based on the constraints, an entire portion of the buffer may be added to an IO request, or the buffer may be split into a first portion and a second portion. The first portion may be added to a first IO request. The second portion may be added to a second IO request, different from the first IO request.

20 Claims, 8 Drawing Sheets

METHOD AND SYSTEM FOR ZERO-COPY DISK IO USING SECTOR UNALIGNED BUFFERS

BACKGROUND

The present invention relates to the field of information technology, including, more particularly, to systems and techniques for managing input/output transactions.

Computers are tasked with some of the world's most difficult problems such as weather forecasting, gene sequencing, simulations, and many others. Yet, computers have also had a tremendous impact on consumers through such devices as the personal computer, smartphone, tablet computer, and so forth. Computers have allowed us to solve complex equations, surf the web, and search libraries of everything from banking records and encyclopedias to our favorite recipes.

Time matters. There is an ever-increasing demand for systems and techniques that enable faster and more efficient transactions. Input/output or IO refers to the transfer of data between a requesting application and a device. For example, in a write operation data from the application is written to disk. In a read operation data is read from the disk and provided to the application. Current IO techniques have high overhead and make inefficient use of CPU resources.

Thus, there is a need to provide improved systems and techniques for managing IO transactions.

DETAILED DESCRIPTION

Figure 1:
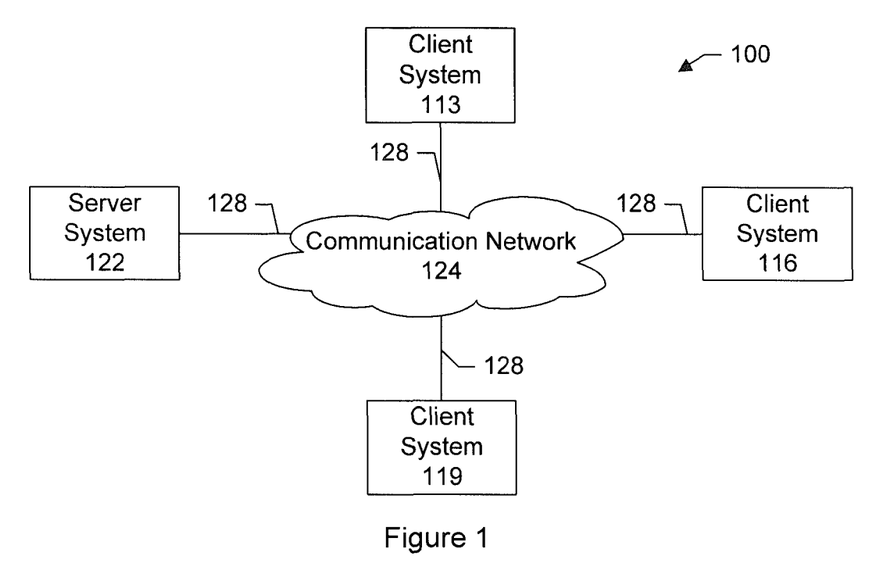
FIG. 1 shows a block diagram of a client-server system and network in which an embodiment of the invention may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, and the Firefox browser provided by Mozilla Foundation, and others.

Figure 2:
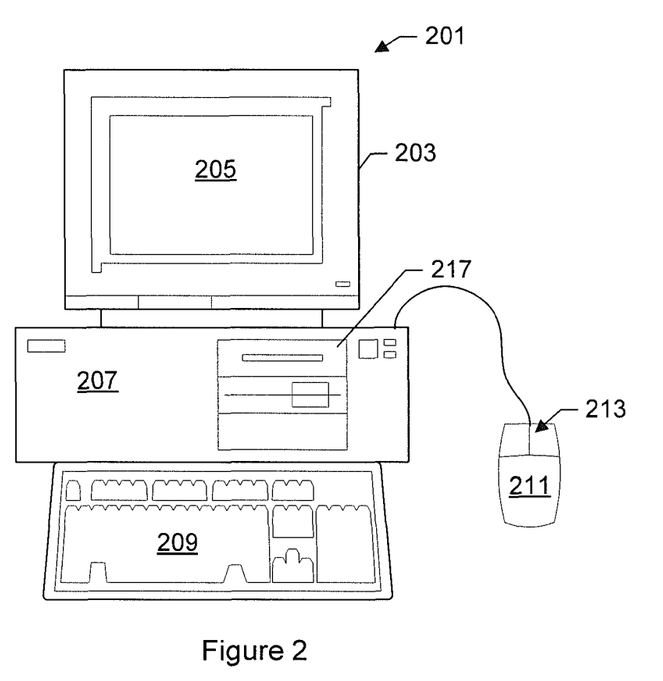
FIG. 2 shows a more detailed diagram of an exemplary client or computer which may be used in an implementation of the invention.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
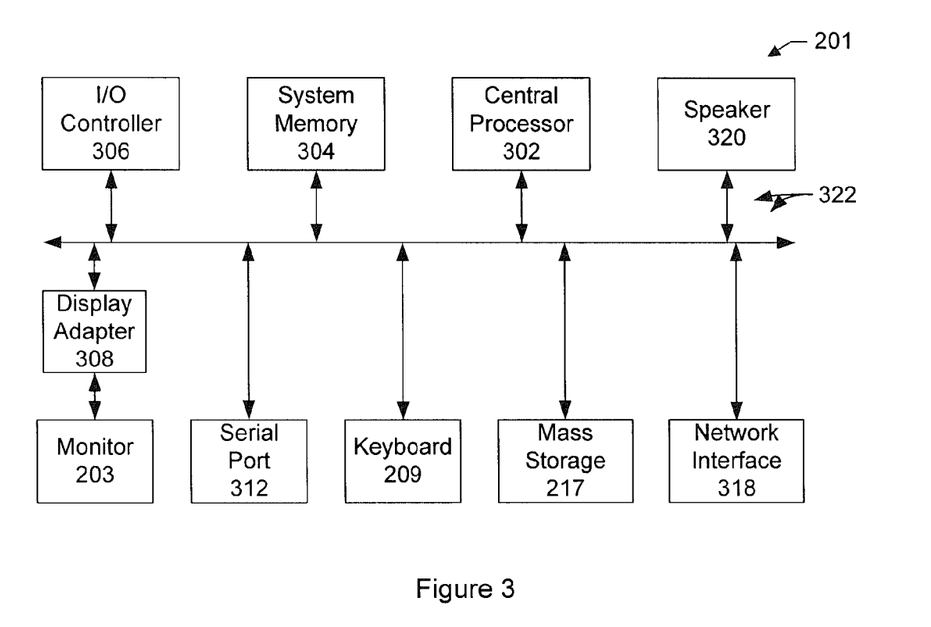
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, Java, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
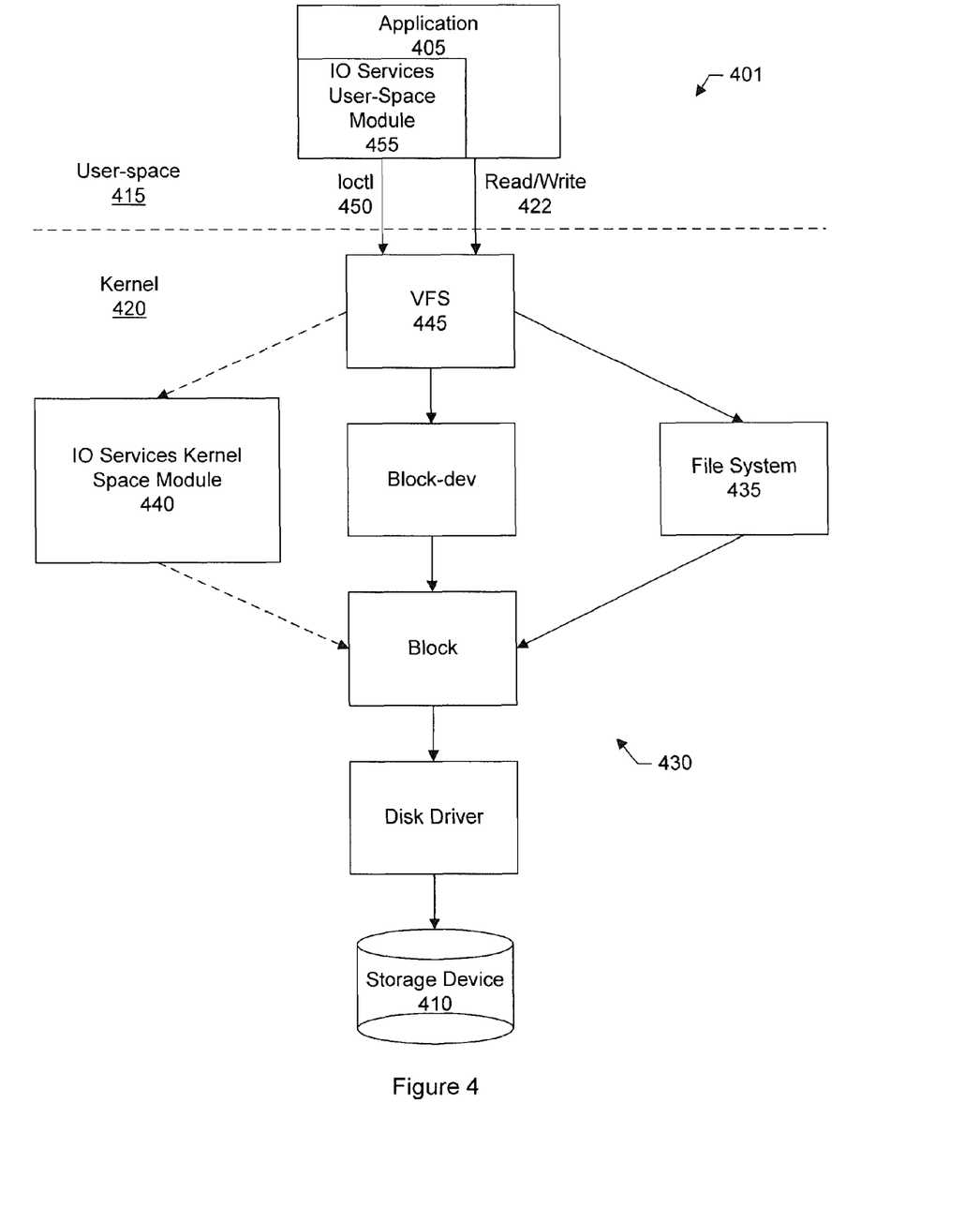
FIG. 4 shows a block diagram of an environment in which a specific implementation of the system facilitates transferring data between an application and a storage device.

FIG. 4 shows an environment 401 where data may be transferred between an application 405 and a storage device 410. In a specific embodiment, the invention is implemented in an iSCSI (Internet Small Computer System Interface) storage server or an environment that uses the iSCSI protocol. The iSCSI protocol is an Internet Protocol (IP)-based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients (e.g., initiators) to send SCSI commands (CDBs) to SCSI storage devices (e.g., targets) on remote servers.

As shown in the schematic of FIG. 4, there is a user space 415 and a kernel space 420 of a computer operating system memory. The user space provides a region of memory for handling user processes such as an executing instance of a program. The kernel space is where the core of the operating system executes and provides services to the user processes. The kernel space is accessed by user processes through the use of system calls or requests such as requests to read data from or stored on storage device 410, or requests to write data to the storage device, i.e., read/write or data transfer requests 422.

The kernel space may include one or more block layers or layered block device drivers 430 that handle requests for block devices of the system and manipulate information within a storage operating system. A block device may be hardware, software, or a combination of hardware and software that is capable of moving or transferring data in the form of addressed blocks. The kernel space may further include a file system 435.

A feature of the invention provides for performing zero-copy disk IO (input/output) using user-space memory buffers whose start and end addresses are not aligned or that are not aligned on sector, e.g., 512 byte, boundaries in an operating system that requires such alignment. Typically, read/write requests are performed by copying data to an intermediate sector aligned buffer and passing the intermediate buffer to the disk driver. The disadvantage is that this process incurs the overhead of data copying, which consumes CPU cycles, stalls CPU execution due to cache misses, and pollutes the CPU caches with data not likely to be accessed again. Passing IO buffers directly from the application to the disk using the SCSI Generic (SG) IO interface, which does not have a sector aligned buffer requirement, does not allow the use of layered block device drivers, such as a Logical Volume Manager (LVM), Distributed Replicated Block Device (DRBD), or both.

The systems and techniques described in this patent application allow avoiding data copying by passing the original application IO buffer to the disk driver—thus saving CPU cycles and eliminating or reducing inefficient cache utilization—while allowing use of layered block device drivers such as LVM and DRBD.

In a specific embodiment, a system and technique for avoiding intermediate data copying is implemented in the Linux operating system environment, but aspects and principles of the invention are applicable to other operating systems. The Linux OS provides kernel system calls for use by applications to read/write to disk devices. These system calls provide a convenient way for an application to read/write without being aware of the details of the underlying hardware or the device drivers. The same set of system calls can be used to work with files in a file system or raw disk devices. The latter is typically used by applications that maintain their own disk data structures and do their own in-memory caching of disk data. A specific example of such an application is DART provided by EMC Corporation of Hopkinton, Mass. In the case of raw devices, much of the kernel IO software stack can be bypassed. However, the basic system calls remain the same.

Applications that use raw disk devices rather than files typically prefer to read/write data directly to their memory buffers, without any intermediate copying by the kernel, for efficiency reasons. They pass a list of memory buffers (called a scatter-gather list) to the kernel. Copying data between two memory buffers consumes CPU cycles and is inefficient, and even more so in the case of disk data due to the large amounts of data involved. Some OS's may include support for a flag (e.g., O_DIRECT in Linux) that can be passed to the system call that tells the kernel that the buffer should be handed directly to the underlying device. There is, however, a restriction when using this flag. The start address and size of each IO buffer in the scatter-gather list supplied must be aligned on a 512 byte boundary. If the buffer is unaligned, the kernel will transparently allocate a suitable aligned buffer and use that as the intermediate data buffer. The reason behind this restriction is that the kernel block subsystem can break-up a single application request into multiple disk requests, and each disk request should be sized on a multiple of sector size.

Applications, such as the EMC DART application, that provide iSCSI, NFS, and CIFS services to network clients may implement their own version of the TCP/IP protocol for performance reasons and may not rely on the underlying operating system's implementation. Network buffers are directly used to perform disk IO. These network buffers are usually about 1500 bytes in size, and may contain up to 1448 of data. These buffers may be double word, i.e., 4 byte, aligned. Thus, they do not meet the OS alignment restrictions.

A feature of the invention provides for circumventing the OS alignment requirements using only publicly available interfaces. In a specific implementation, an IO services kernel module 440 is inserted into the kernel. The module provides a set of IO services to applications. This module uses published kernel module interfaces. It uses special algorithms to overcome the constraints imposed by the underlying interfaces.

For example, typically, read/write system calls are handled by a virtual file system (VFS) layer 445 in the kernel. This layer performs some generic checks such as the validity of the requested file/device, and then calls target specific functions to initiate the request. For a file request, the target subsystem is the file system driver whereas for a raw device, the target is the block-dev driver. Both ultimately forward the request to the block subsystem. This application discusses techniques to more efficiently read and write data on raw devices.

The block subsystem presents a generic block device interface to upper layers. It hides the details of the underlying device. When it receives an IO request, it has to ensure that the request matches the constraints imposed by the device. These constraints include:

1. Maximum IO size, i.e., maximum number of sectors the device can transfer in a single request.
2. Maximum number of scatter-gather (SG) elements, where each SG element describes a portion of the IO buffer typically spanning one or more physically contiguous pages.
3. On-disk boundaries—some devices have restrictions that prevent IOs from crossing pre-defined boundaries on disk. Such devices are generally software devices, such as LVM (Logical Volume Manager) and DRBD (Distributed Replicated Block Device). When a request crosses the specified disk boundary, it has to be split into separate requests.
4. The request should be a multiple of sector size.

These constraints are advertised to other modules through public interfaces.

In order to properly format requests, the block layer exposes interfaces to upper layers that accept a single 4 KB page of data or less at a time, referred to hereafter as a buflet. If a buflet causes the IO request to violate any of the above constraints, it is rejected. Upon rejection, the upper layer submits previously accepted buflets as a single request and starts a new request for subsequent buflets. Since it is not known in advance which buflets would be rejected, the upper layers require each buflet start address and size to be sector aligned so that adding a new buflet to a request will keep it sector aligned.

In a specific implementation, the IO services module of the invention uses the device constraints published by the block layer to predict whether a buflet will violate any of the constraints. If so, it truncates it to the largest acceptable size and adds it to the request using the block layer interface. The remaining portion of the buflet is added to a new request. In one embodiment, the module is referred to as DirectVol and is incorporated with the EMC Storage Virtual Appliance (SVA) product provided by EMC Corporation. The module is configured to sit between the VFS and Block layers. The module presents a pseudo device to applications for each backing raw device and applications can issue IO requests to it using ioctl system calls 450. As shown in FIG. 4, there may be an IO services user space module 455 or counterpart in user-space that facilitates the interaction between the application and the pseudo device.

In a specific implementation, since the module predicts the validity of a buflet, it can add odd-sized and misaligned buflets without fear of it being rejected by the block layer. This allows it to pass the application memory buffers directly to the device and not incur the overhead of an intermediate copy. In this specific implementation, module code uses Linux GPL interfaces only and thus need not be open-sourced.

Figure 5:
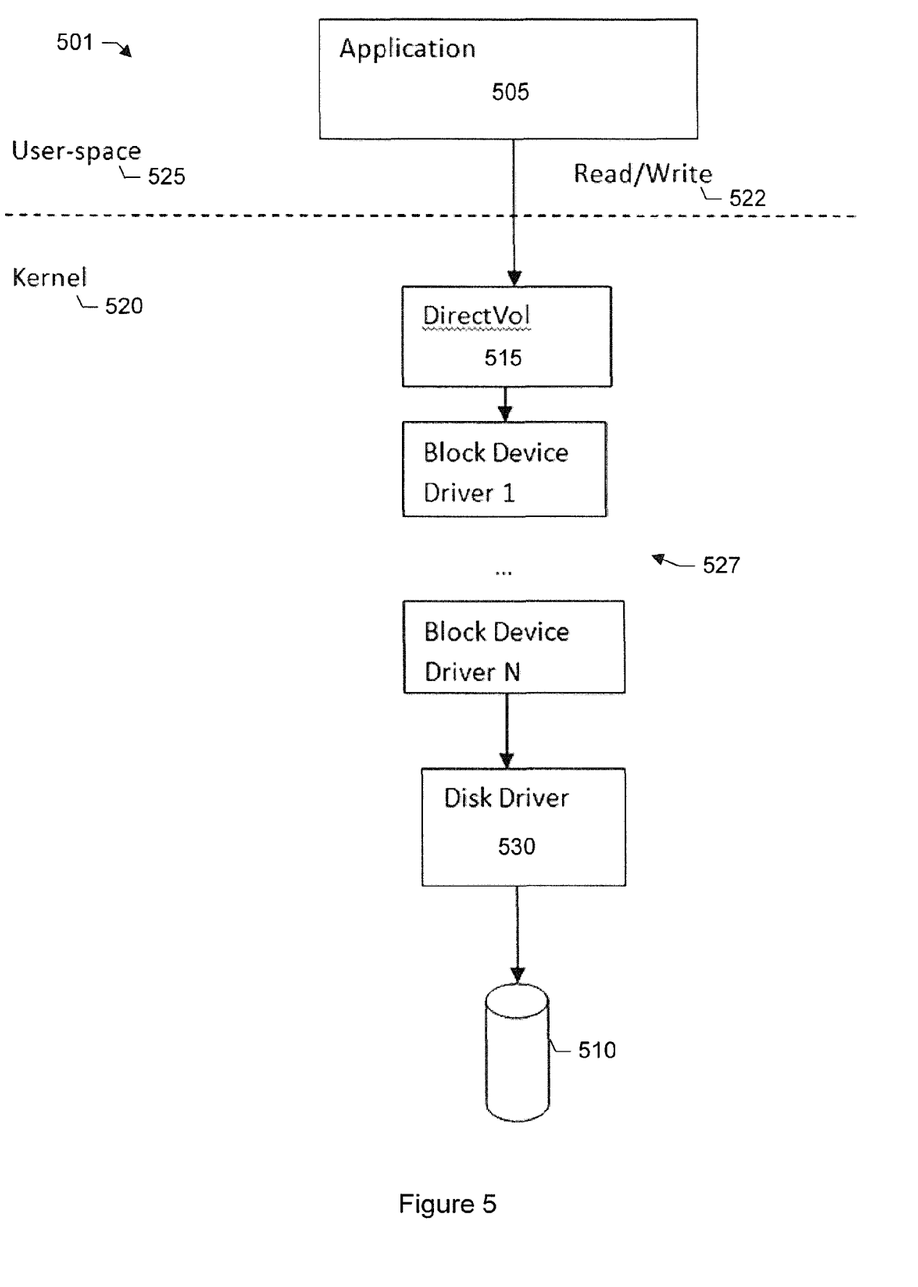
FIG. 5 shows another block diagram of an environment in which a specific implementation of the system facilitates transferring data between an application and a storage device.

FIG. 5 shows another simplified block diagram of an environment 501 where data may be transferred between an application 505 and a storage device 510. As shown in the example of FIG. 5, there is an IO services kernel module 515 executing in a kernel space 520 and which receives IO or read/write requests 522 over a network such as from application 505 in a user-space 525. There can be one or more layers 527 (e.g., block device driver 1 . . . block device driver N) between the storage device or a disk driver 530 and the application.

The IO services kernel module can bypass some of the kernel layers involved in IO processing, formulate IO requests, and issue the IO requests to disk or a disk driver using the application provided IO buffer memory. As discussed above, in a specific embodiment, the module is referred to as DirectVol. It should be appreciated, however, that the module may be known by any name or identifier, and this description is provided merely as a sample implementation.

Figure 6:
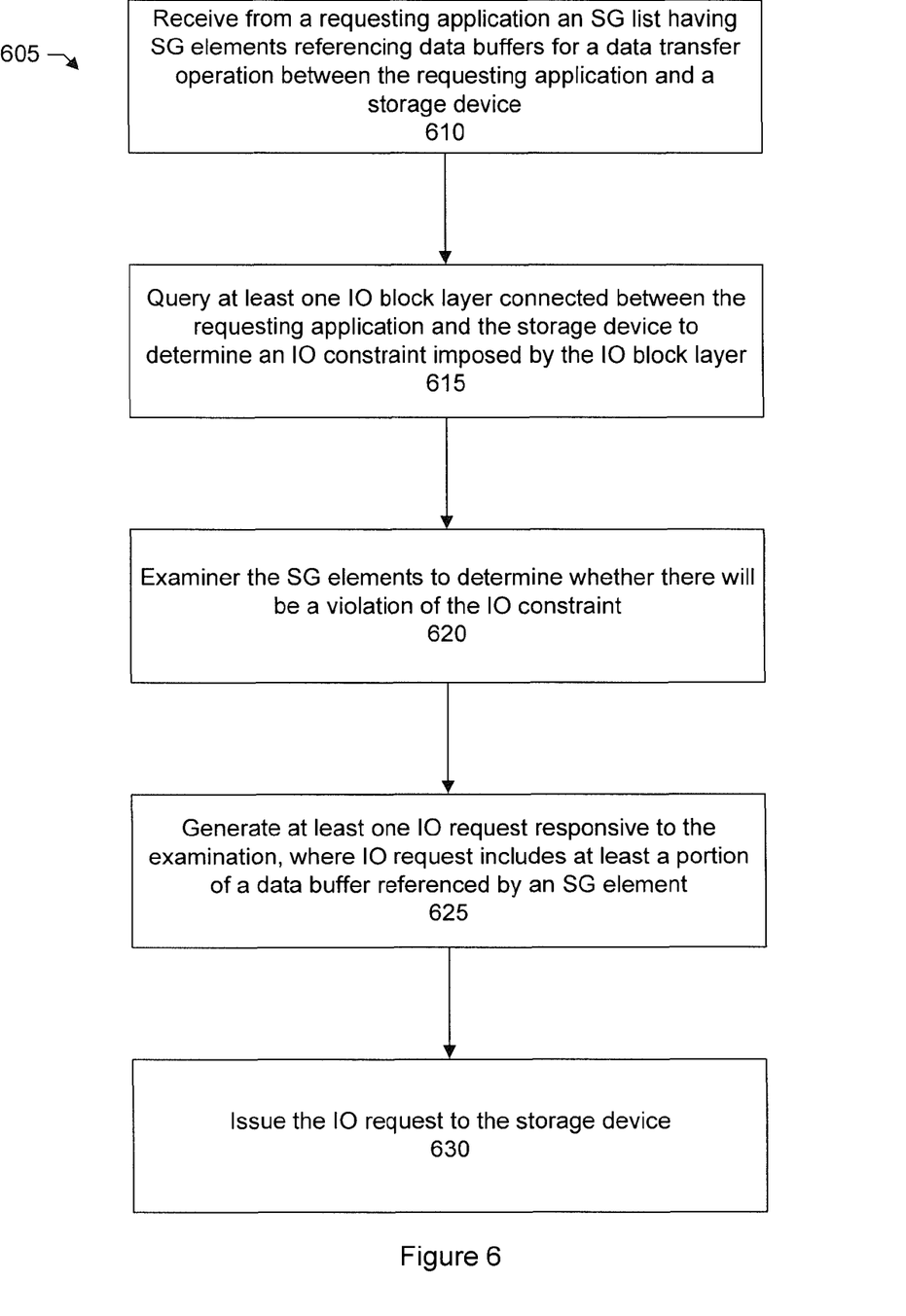
FIG. 6 shows an overall flow diagram for transferring data between an application and a storage device.

FIG. 6 shows an overall flow 605 for processing disk read/write requests. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In a step 610, the IO services module receives from a requesting application (e.g., iSCSI application or iSCSI server) a disk read/write request including a scatter-gather list (SGL). The scatter-gather list includes a set of scatter-gather elements or units referencing data buffers for a data transfer operation between the requesting application and the storage device. Generally, blocks of memory or data buffers are pre-allocated for transferring data between an application and disk. In a write operation, data is transferred from the application to disk. In a read operation, data is transferred from disk to the application. Typically, a data transfer request from an application is formed using a series of memory buffers that can be from about 4 bytes to about 9,000 bytes in size. The memory buffers are chained together and the data in them forms the disk IO request.

In this specific implementation, the received data list from the requesting application is a type of data structure that may be referred to as a scatter-gather list. The data list, however, may be implemented as any data structure that references or identifies locations in application memory where data may be gathered from (such as during a write operation) or where data may be scattered into or stored (such as during a read operation). A scatter-gather element may include a memory start address and a length of a region in the application memory for the data transfer operation. For example, an entry or record in the scatter-gather list may store an address-length pair that identifies, specifies, points to, is associated with, or references a data buffer. In particular, a start address of the data buffer may be stored in an address field of a scatter-gather element. A length of the data buffer may be stored in a length field of the scatter-gather element.

The IO that the requesting application sends or the memory buffers that the application hands off to the VFS layer may not be aligned on 512 byte boundaries and may not be a multiple of 512 bytes. One reason is because, typically, network buffers may be short data packets that are word aligned that may be of various lengths. File systems, however, typically read from or write to a memory address using blocks or chunks of a predetermined size. So, in order to properly handle the buffer data, the kernel will copy the data into intermediate buffers. As discussed above, this adds processing overhead.

In a step 615, the IO services module queries at least one IO block layer connected between the requesting application and the storage device to determine an IO constraint imposed by the at least one IO block layer. As discussed above, typically, each layer between the disk driver or disk and the kernel introduces its own constraints for handling IO. Indeed, the disk driver can also impose constraints such as maximum IO size. As a further example, some layers require that the IO not span certain boundaries on the disk. LVM includes restrictions on IOs that cross a four kilobyte boundary on disk. DRBD includes restrictions on IOs that cross a 32 kilobyte boundary on disk. Some layers have restrictions on the total size of an IO, i.e., size restrictions.

In a step 620, the IO services module examines the scatter-gather elements to determine whether there will be a violation of the IO constraint. In a step 625, the module generates at least one IO request responsive to the examination. The IO request includes at least a portion of a data buffer referenced by a scatter-gather element. In a step 630, the module issues the at least one IO request to the storage device or storage device driver.

More particularly, in a specific implementation, the module examines each element in the scatter-gather list, but before adding the referenced data buffer to an IO, the module looks ahead and makes sure that the underlying device can accommodate additional data up to a 512 byte boundary. The module can look ahead into the following buffers to make sure that the IO can be split in order to meet the device constraints.

Figure 7:
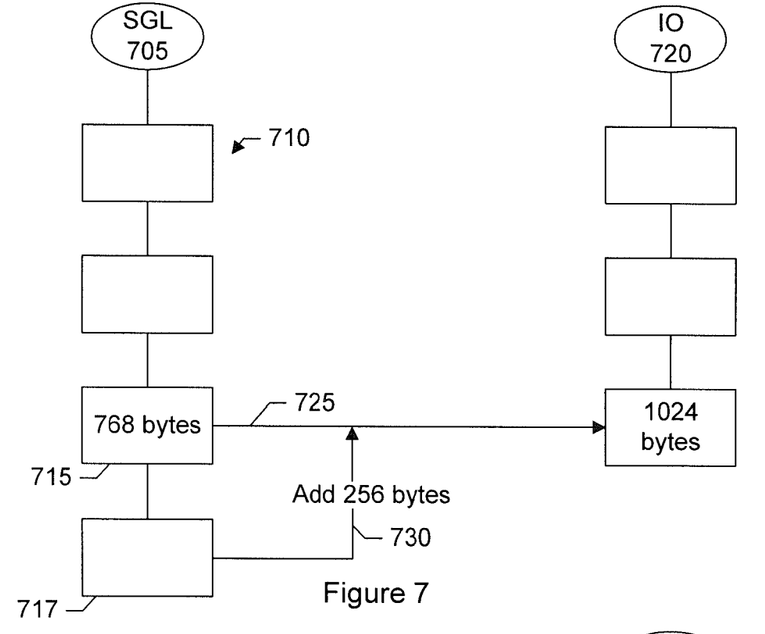
FIG. 7 shows a schematic diagram of a specific implementation of a technique for forming and generating IO requests.

For example, FIG. 7 shows a schematic for forming and generating IO requests according to techniques described in this patent application. As shown in FIG. 7, there is a scatter-gather list 705 having scatter-gather elements referencing data buffers 710. Consider, as an example, that buffer or buflet 715 has a size 768 bytes, which is not a multiple of 512 bytes. That is, 768 divided by 512 equals 1.5 which is a fraction and is not an integer or whole number.

Adding 256 bytes to 768 bytes, however, results in 1024 bytes which is a multiple of the 512 byte sector size. In a specific implementation, the 256 bytes added is not padding or meaningless bytes, but rather actual data from a following buflet (i.e., SG element) 717. Thus, 1024 divided by 512 equals an integer or whole number, e.g., 2. In a specific implementation, the IO services module examines the next buffer and queries the underlying layers (e.g., LVM, DRBD, or both) and makes sure that these layers can accept at least 256 more bytes. If so, the module adds the buffer to an IO request 720 and then examines the next buffer.

More particularly, in this first case example, the underlying layers can accept 256 additional bytes of data so it is then safe to add the buffer to the IO as shown by arrows 725 and 730. That is, in this first case, the layers can accept the current buffer of 768 bytes as well as the additional data of 256 bytes that comes from the next SG element (or buffer referenced by the SG element) for a total of 1024 bytes—which is a multiple of 512 bytes. For example, as shown in FIG. 7, an additional 256 bytes of data has been obtained 730 from the fourth SG element and added to IO 720. So, in this specific implementation, an entire or whole portion of the buffer may be added to the IO request. The added data may further include at least a portion of data from a next buffer so that the resulting sum of the data or size of the data will be sector-aligned or a multiple of 512 bytes.

In a specific implementation, a method for transferring data between a requesting application and a storage device includes receiving from the requesting application a scatter-gather list that includes a sequence or series of scatter-gather (SG) elements referencing data buffers for a data transfer operation. The method further includes querying at least one layered block device driver connected between the requesting application and the storage device to determine an IO constraint imposed by the at least one layered block device driver, and examining a first SG element in the sequence of SG elements to determine whether there will be a violation of the IO constraint. Upon determining that there will not be a violation of the IO constraint, the method further includes adding to an IO request an entire portion of a data buffer referenced by the first SG element and at least a portion of another data buffer referenced by a second SG element in the sequence of SG elements. In a specific implementation, the second SG element is an SG element that is next to, subsequent to, follows, or is immediately after the first SG element in the sequence of SG elements.

Figure 8:
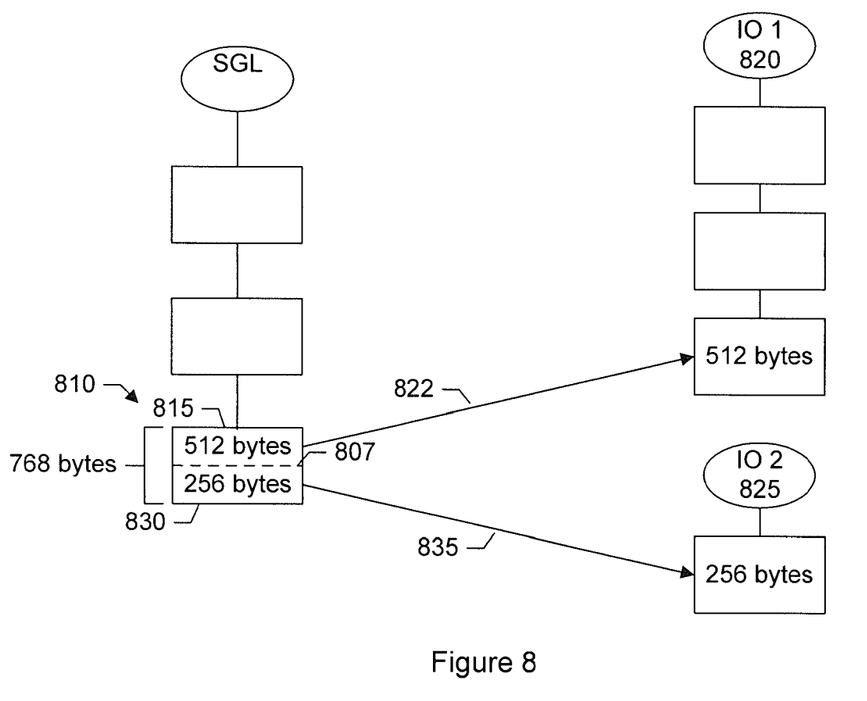
FIG. 8 shows a schematic diagram of another specific implementation of a technique for forming and generating IO requests.

FIG. 8 shows a schematic of another example for forming and generating IO requests according to techniques described in this patent application. If, however, the layers cannot accept all the data, the module splits (as shown by a broken line 807) a data or data buffer 810. A first portion 815 of the buffer is added or copied to a first IO 820 as shown by arrow 822 and the first IO is issued. The module starts a new or second IO 825 and adds or copies a remainder portion 830 of the buffer to the new IO as shown by arrow 835.

In other words, in continuing with the example above, in this second case example, the underlying layers (e.g., LVM or DRBD) cannot accept the 256 bytes of additional data or padding data of 256 bytes. This may be because, for example, combining the data will cause there to be a violation of a size restriction. In this second case, the current buffer is split, divided, or partitioned. Thus, in this example, the 768 byte buffer is split into a 512 byte portion (e.g., first portion) and a 256 byte portion (e.g., second portion or remainder portion)—512 bytes+256 bytes=768 bytes. The various layers may guarantee that each IO can accept at least or a minimum of 512 bytes. The module examines the next buffer and queries the underlying layers (e.g., LVM, DRBD, or both) to make sure that these layers can accept at least 256 more bytes. Note that additional data may be added to the 256 byte portion of second IO 825 such as when advancing to the next scatter-gather element in order to provide a 512 byte multiple.

In a specific implementation, a first portion of a buffer is added to a first IO request. A second portion of the buffer is added to a second IO request, different from the first IO request. The second portion may be referred to as a remainder. A size of the first portion may be a multiple of 512 bytes. A size of the second portion may not be a multiple of 512 bytes. Data from another or next buffer may be added with the second portion so that a sum or a size of the combined data is a multiple of 512 bytes. That is, data from the next buffer may be added to round up to a multiple of 512 bytes. The first IO request may be issued before the second IO request is issued. That is, the second IO request may be issued after the first IO request is issued.

The techniques described in this patent application allow operations to be performed directly on the application memory buffers or the memory buffers that are provided by the application, rather than having to allocate separate buffers and copy unaligned application buffers over. Indeed, in the case of information received over a network, such as in the case of an iSCSI server, every buffer is likely to be unaligned because the information will be a network packet—typically having 1500 bytes of data which is the size of an Ethernet packet. Thus, every buffer may be misaligned and the data being transferred through the application would be copied into temporary memory buffers before being sent to disk. Copy data into these temporary memory buffers can be avoided using the techniques described in this patent application.

In a specific implementation, a technique as described in this patent application is referred to as a look-ahead. When processing one buffer, a next or subsequent buffer is examined. A portion of padding may be removed and a verification performed to ensure that the combined chunk can be added to the IO. The look-ahead helps to determine whether a current buffer should or should not be split.

Figure 9:
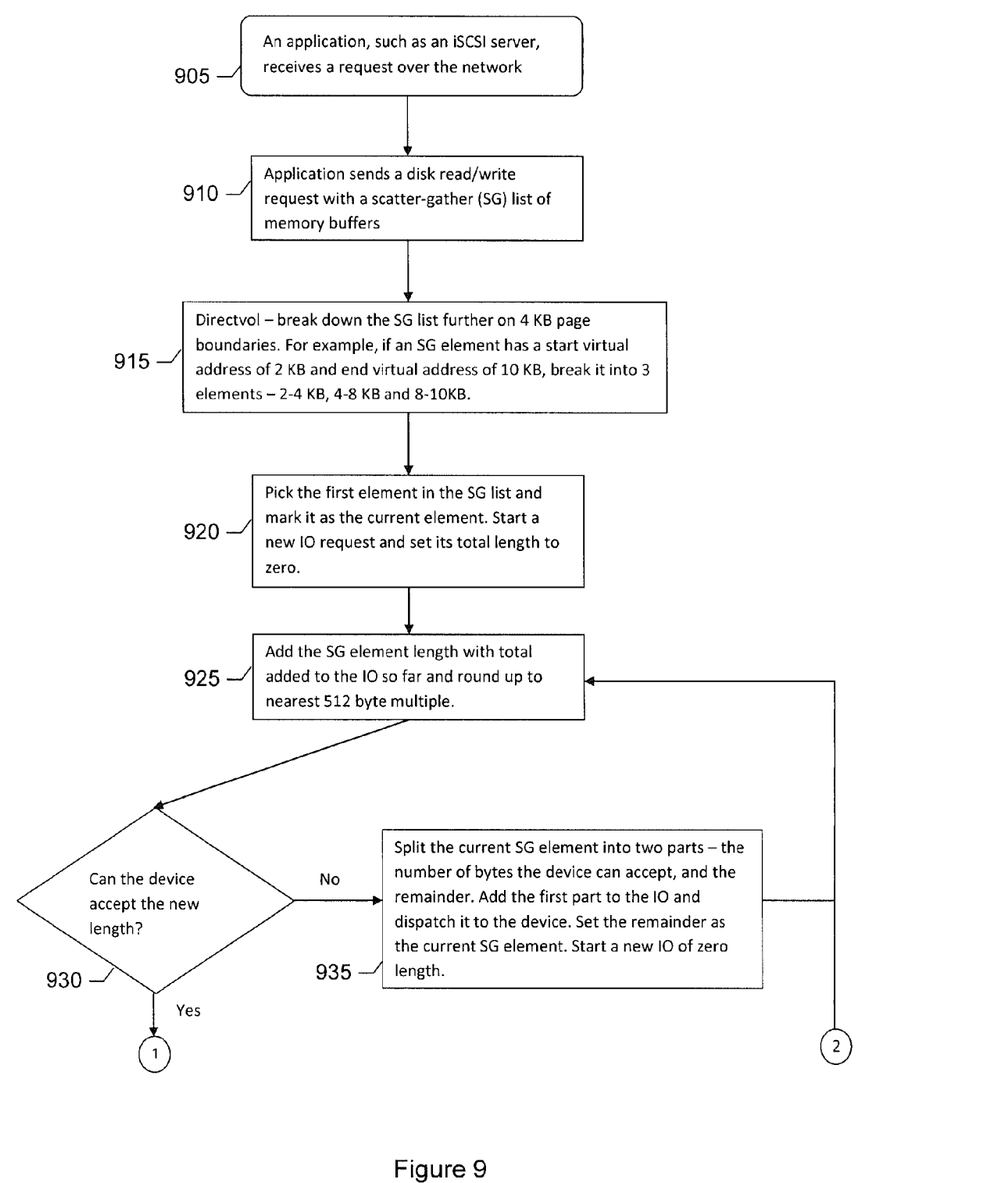
FIG. 9 shows a flow diagram of a specific implementation for forming and generating IO requests.
Figure 10:
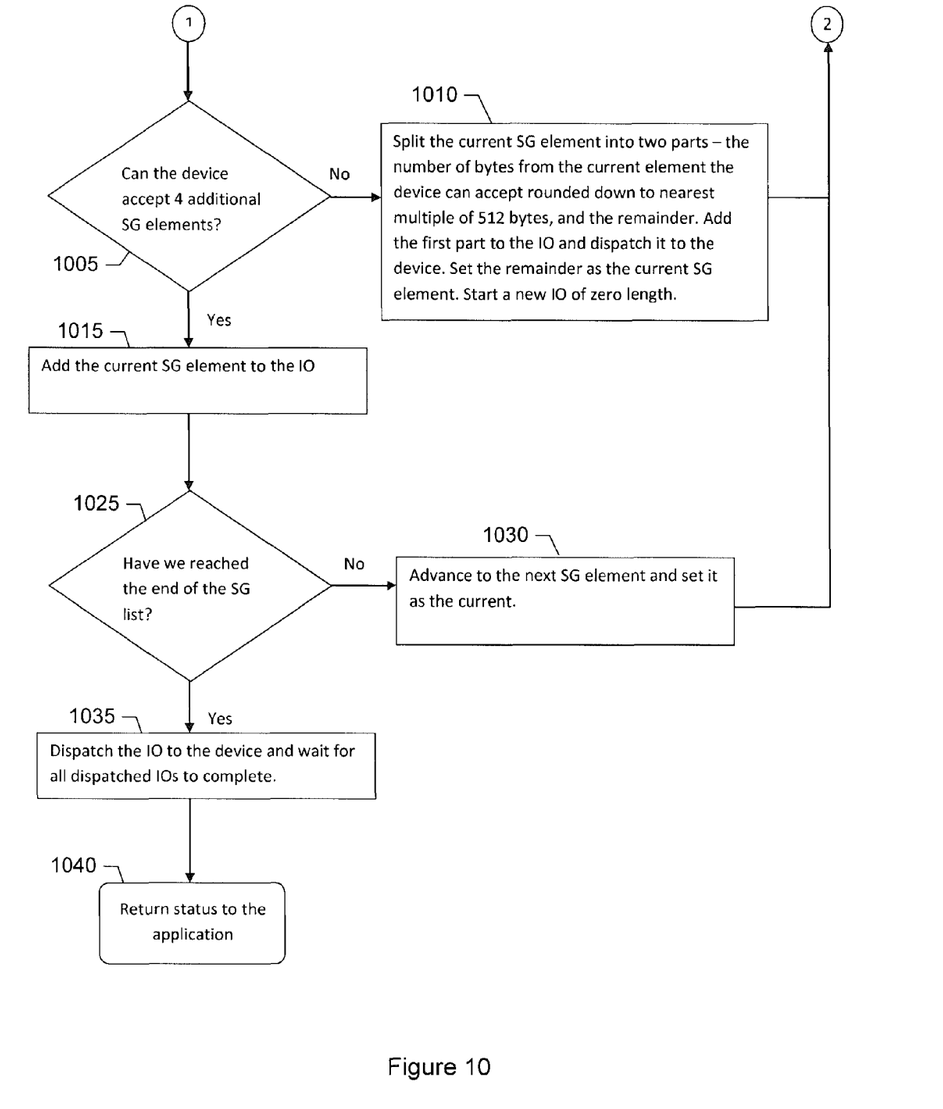
FIG. 10 shows a continuation of the flow diagram shown in FIG. 9.

FIGS. 9-10 show flow diagrams of a specific implementation of a technique for avoiding copying to a temporary buffer. An application, such as an iSCSI server, receives a request over a network (905). The application sends a disk read/write request with a scatter-gather (SG) list of memory buffers (910). The SG list is received by an IO services module in the kernel space. The module (which may be referred to as DirectVol), breaks down the SG list further on 4 KB page boundaries. For example, if an SG element has a start virtual address of 2 KB and an end virtual address of 10 KB, break it into three elements—2-4 KB, 4-8 KB, and 8-10 KB (915). Pick the first or initial element in the SG list and mark it as the current element. Start a new IO request and set its total length to zero (920).

Add the SG element length with total added to the IO so far and round up to the nearest 512 byte multiple (925). Determine whether the device can accept the new length (930). If the device cannot accept the current length, split the current SG element into two parts—the number of bytes the device can accept, and the remainder. Add the first part to the IO and dispatch it to the device. Set the remainder as the current SG element. Start a new IO of zero length (935). If the device can accept the new length, determine if the device can accept additional (e.g., four additional) SG elements (1005—FIG. 10). If not, split the current SG element into two parts—the number of bytes from the current element the device can accept rounded down to the nearest multiple of 512 bytes, and the remainder. Add the first part to the IO and dispatch it to the device. Set the remainder as the current SG element. Start a new IO of zero length (1010).

If the device can accept the additional SG elements, add the current SG element to the IO (1015). Determine whether the end of the SG list has been reached (1025). If the end of the SG list has not been reached, advance to the next SG element and set it as the current (1030). If the end of the SG list has been reached, dispatch the IO to the device and wait for all dispatched IOs to complete (1035). Return status to the application (1040).

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A system for transferring data between a requesting application and a storage device, the system comprising:
   a processor-based input/output management system executed on a computer system and configured to:
   receive from the requesting application a scatter-gather list having a plurality of scatter-gather elements referencing data buffers for a data transfer operation;
   query at least one layered block device driver coupled between the requesting application and the storage device to determine an input/output constraint imposed by the layered block device driver, the constraint not including alignment of data with a boundary;
   examine each scatter-gather element to determine whether there will be a violation of the input/output constraint;
   generate at least one input/output request responsive to the examination; and
   issue the input/output request to the storage device, wherein the input/output request comprises at least a portion of a data buffer referenced by a scatter-gather element.

2. The system of claim 1 wherein the processor-based input/output management system is configured to:
   upon a determination that there will be a violation of the input/output constraint, partition the data buffer into first and second buffer portions to satisfy the input/output constraint;
   add the first buffer portion to a first input/output request; and
   add the second buffer portion to a second input/output request, different from the first input/output request, wherein the first input/output request is the at least one input/output request, and the first buffer portion is the at least a portion of a data buffer.

3. The system of claim 1 wherein the processor-based input/output management system is configured to:
   upon a determination that there will not be a violation of the input/output constraint, add to the at least one input/output request an entire portion of the data buffer referenced by the scatter-gather element and additional data from a next buffer.

4. The system of claim 1 wherein the at least one layered block device driver comprises a Logical Volume Manager (LVM) of a Linux kernel.

5. The system of claim 1 wherein the at least one layered block device driver comprises a Distributed Replicated Block Device (DRBD) of a Linux kernel.

6. The system of claim 1 wherein the processor-based input/output management system is configured to:
   split the data buffer referenced by the scatter-gather element into first and second buffer portions to satisfy the input/output constraint if there will be a violation of the input/output constraint;
   add the first buffer portion to a first input/output request; and
   add the second buffer portion to a second input/output request, different from the first input/output request, wherein the first input/output request is the at least one input/output request, and the first buffer portion is the at least a portion of a data buffer.

7. A method for transferring data between a requesting application and a storage device comprising:
   receiving from the requesting application a scatter-gather list having a plurality of scatter-gather elements referencing data buffers for a data transfer operation;
   querying at least one layered block device driver coupled between the requesting application and the storage device to determine an input/output constraint imposed by the layered block device driver, the constraint not including alignment of data with a boundary;
   examining each scatter-gather element to determine whether there will be a violation of the input/output constraint;
   generating at least one input/output request responsive to the examination; and
   issuing the input/output request to the storage device, wherein the input/output request comprises at least a portion of a data buffer referenced by a scatter-gather element.

8. The method of claim 7 comprising:
   upon a determination that there will be a violation of the input/output constraint, partitioning the data buffer into first and second buffer portions to satisfy the input/output constraint;
   adding the first buffer portion to a first input/output request; and
   adding the second buffer portion to a second input/output request, different from the first input/output request, wherein the first input/output request is the at least one input/output request, and the first buffer portion is the at least a portion of a data buffer.

9. The method of claim 7 comprising:
   upon a determination that there will not be a violation of the input/output constraint, adding to the at least one input/output request an entire portion of the data buffer referenced by the scatter-gather element and at least a portion of another data buffer referenced by a next scatter-gather element.

10. The method of claim 7 wherein the at least one layered block device driver comprises a Logical Volume Manager (LVM) of a Linux kernel.

11. The method of claim 7 wherein the at least one layered block device driver comprises a Distributed Replicated Block Device (DRBD) of a Linux kernel.

12. The method of claim 7 wherein the generating at least one input/output request responsive to the examination comprises:
    splitting the data buffer referenced by the scatter-gather element into first and second buffer portions to satisfy the input/output constraint if there will be a violation of the input/output constraint;
    adding the first buffer portion to a first input/output request; and
    adding the second buffer portion to a second input/output request, different from the first input/output request, wherein the first input/output request is the at least one input/output request, and the first buffer portion is the at least a portion of a data buffer.

13. The method of claim 7 wherein a size of the data buffer is not a multiple of 512 bytes and the at least one input/output request comprises a multiple of 512 bytes.

14. The method of claim 7 wherein the requesting application comprises an iSCSI server.

15. A computer program product, comprising a non-transitory computer-readable medium having a computer-readable program code embodied therein, the computer-readable program code adapted to be executed by one or more processors to implement a method comprising:
- receiving from the requesting application a scatter-gather list having a plurality of scatter-gather elements referencing data buffers for a data transfer operation;
- querying at least one layered block device driver coupled between the requesting application and the storage device to determine an input/output constraint imposed by the layered block device driver, the constraint not including alignment of data with a boundary;
- examining each scatter-gather element to determine whether there will be a violation of the input/output constraint;
- generating at least one input/output request responsive to the examination; and
- issuing the input/output request to the storage device, wherein the input/output request comprises at least a portion of a data buffer referenced by a scatter-gather element.

16. The computer program product of claim 15 wherein the method comprises:
- upon a determination that there will be a violation of the input/output constraint, partitioning the data buffer into first and second buffer portions to satisfy the input/output constraint;
- adding the first buffer portion to a first input/output request; and
- adding the second buffer portion to a second input/output request, different from the first input/output request, wherein the first input/output request is the at least one input/output request, and the first buffer portion is the at least a portion of a data buffer.

17. The computer program product of claim 15 wherein the method comprises:
- upon a determination that there will not be a violation of the input/output constraint, adding to the at least one input/output request an entire portion of the data buffer referenced by the scatter-gather element and at least a portion of a data buffer referenced by a next scatter-gather element.

18. The computer program product of claim 15 wherein the at least one layered block device driver comprises a Logical Volume Manager (LVM) of a Linux kernel.

19. The computer program product of claim 15 wherein the at least one layered block device driver comprises a Distributed Replicated Block Device (DRBD) of a Linux kernel.

20. The computer program product of claim 15 wherein the generating at least one input/output request responsive to the examination comprises:
- splitting the data buffer referenced by the scatter-gather element into first and second buffer portions to satisfy the input/output constraint if there will be a violation of the input/output constraint;
- adding the first buffer portion to a first input/output request; and
- adding the second buffer portion to a second input/output request, different from the first input/output request, wherein the first input/output request is the at least one input/output request, and the first buffer portion is the at least a portion of a data buffer.

* * * * *